United States Patent [19]

Tarnay

[11] Patent Number: 4,499,526
[45] Date of Patent: Feb. 12, 1985

[54] LAMP UNIT HAVING GLASS REFLECTOR MEMBER WITH RECESSED BASE END

[75] Inventor: Denes Tarnay, Cleveland, Ohio

[73] Assignee: General Electric Company, Schenectady, N.Y.

[21] Appl. No.: 526,301

[22] Filed: Aug. 25, 1983

[51] Int. Cl.³ ............................................. F21V 7/00
[52] U.S. Cl. ................................ 362/263; 362/350; 65/65
[58] Field of Search ............... 362/263, 306, 350, 396, 362/389, 16, 267, 346; 65/63, 65, 284, 285

[56] References Cited

U.S. PATENT DOCUMENTS

| | | | |
|---|---|---|---|
| 2,394,116 | 2/1946 | Snyder | 65/65 R |
| 3,314,331 | 4/1967 | Wiley | 362/350 |
| 3,369,883 | 2/1968 | Smith | 65/65 R |
| 4,021,659 | 5/1977 | Wiley | 362/350 |

Primary Examiner—Donald P. Walsh
Attorney, Agent, or Firm—John F. McDevitt; Philip L. Schlamp; Fred Jacob

[57] ABSTRACT

A molded glass reflector member for a lamp unit employing a tungsten halogen lamp as the light source is disclosed having a recessed opening at its base end and which further provides an engagement surface for mounting said lamp unit. Specifically, said improved lamp unit includes a molded glass reflector member terminating at its base end in an elongated hollow cavity protruding from the rear side of said reflector member, said cavity having a recessed opening of smaller size at the rearmost end which also provides a recessed engagement surface for mounting said lamp, and a tungsten halogen lamp secured in said hollow cavity so that its light source is positioned at the focal point of said reflector member and the lamp inleads project through said recessed opening. In a preferred embodiment, said recessed opening is formed by spaced apart shoulders extending from the inner walls of the protruding hollow cavity.

7 Claims, 2 Drawing Figures

LAMP UNIT HAVING GLASS REFLECTOR MEMBER WITH RECESSED BASE END

BACKGROUND OF THE INVENTION

Lamp units utilizing a glass reflector having a front concave reflecting portion, generally of a parabolic shape, and further utilizing a tungsten halogen lamp inserted therein as the light source have been used for some time especially in photographic projector installations. Said tungsten halogen lamp is generally inserted into an elongated hollow cavity portion protruding from the rear side of said reflector member and with the lamp being secured in said cavity by an adhesive cement so that its filament light source is positioned at the focal point of said reflector member. The lamp inleads project through the rear opening of said hollow cavity portion and said end of the reflector member also serves to mount the lamp unit in the socket of the particular end product installation.

Conventional glass reflector members of this type are manufactured with a saw-cut end on said protruding hollow cavity portion after being molded or pressed and the saw-cut end produces the desired size and shape opening without further reheating. Understandably, the saw cutting operation is labor intensive and can contaminate the reflector surface area of said reflector member with glass residue. A known improvement in said reflector manufacture eliminates the saw cutting operation and simply hot punches the desired opening in a reflector member molded with the protruding cavity portion having a closed end and thereafter fire polishes this end of the reflector. Unfortunately, the amount of fire polishing needed to smooth the end of a reflector member manufactured in this manner is considerable resulting in sufficient glass deformation to seriously impede a proper fit of the lamp unit in the socket of the end product installation.

SUMMARY OF THE INVENTION

It has now been discovered that providing a recessed opening at the rearmost end of the hollow cavity portion in this type reflector member establishes an engagement surface for mounting said lamp unit which remains undisturbed during the subsequent manufacturing operations customarily employed. More particularly, said improved lamp unit construction includes a molded glass reflector member terminating at its base end in an elongated hollow cavity protruding from the rear side of said reflector member, said cavity having a recessed opening of smaller size at the rearmost end and which provides a recessed engagement surface for mounting said lamp, and a tungsten halogen lamp secured in said hollow cavity so that its light source is positioned at the focal point of said reflector member with the lamp inleads project through said opening. In the preferred embodiment, said recessed opening is formed by spaced apart shoulders extending from the inner walls of said cavity. To manufacture said preferred glass reflector member requires (a) molding said reflector member with the rearmost end of said cavity being closed by a recessed shoulder portion bridging the inner walls of said cavity, (b) reheating the recessed shoulder portion at the rearmost end of said cavity sufficiently to form an opening thereat in the molten glass by mechanical means, and (c) reheating the rear most end of said cavity to selectively heat polish the end itself but not the recessed opening region.

In the foregoing manner, the outer surface of said recessed shoulder is free to physically engage a mating surface in the socket of the end product installation since reheating the end of the elongated cavity does not produce glass deformation in the recessed opening region. The reheating of said cavity end can be accomplished with a gas burner and wherein the recessed opening region is protected from the gas burner flame in a fixture having selective heat shield means.

DESCRIPTION OF THE PREFERRED EMBODIMENTS

Figure 1:
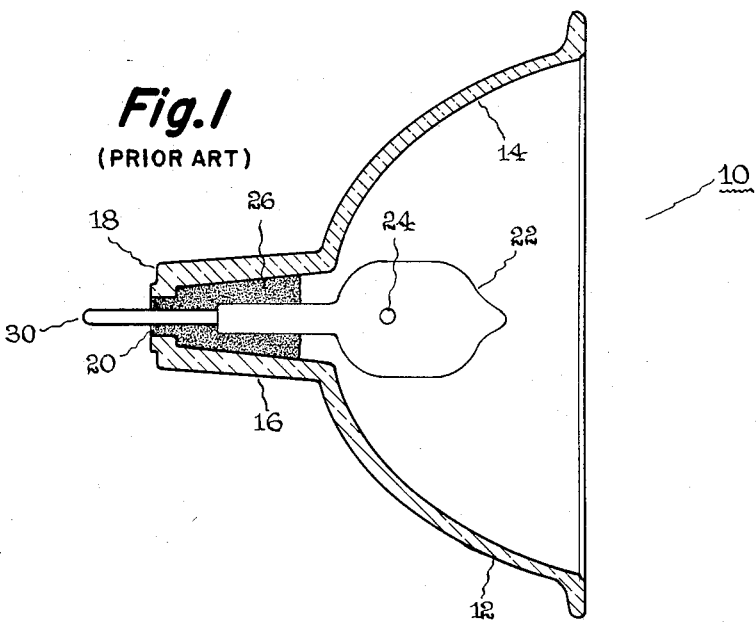
FIG. 1 is a cross-sectional view depicting a prior art lamp unit wherein the cavity end of the reflector member has been saw cut and fire polished.

Referring to FIG. 1, said prior art lamp unit 10 includes a molded or pressed glass reflector member 12 having a generally parabolic reflective surface 14 which terminates at its base end in a protruding elongated hollow cavity portion 16 that provides the structural means to physically connect said lamp unit in its socket. Said cavity 16 is originally molded with a closed end 18 which is customarily saw cut to provide a smaller size opening 20 at the outer most end of said cavity. Said outer most end of the cavity can be optionally fire polished to remove flaws in the glass that might otherwise weaken the lamp unit during use and lead to its premature failure. A conventional tungsten halogen lamp 22 is inserted into the elongated hollow cavity portion of said reflector member so that its light source 24, which is generally a tungsten incandescent filament, resides at the focal point of the parabolic reflective surface. The customary method providing said lamp assembly in the reflector member utilizes an adhesive cement 26 to fix the desired lamp location after said lamp filament has been properly focused. A pair of lamp inlead wires 30 project through the outermost opening at the based end of the reflector member for subsequent electrical connection to terminal elements in the socket member (not shown).

Figure 2:
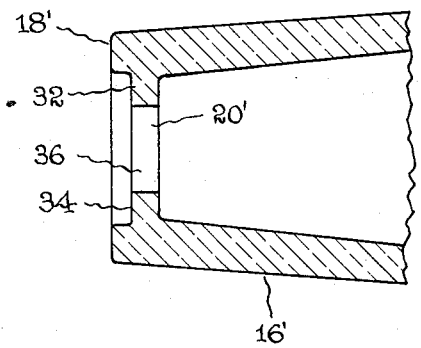
FIG. 2 is a partial cross-sectional view of the terminal end for this type reflector member which is modified in accordance with the present invention.

In FIG. 2 there is shown a partial view of the base end for a molded reflector member of the above type which is modified according to the present invention. Specifically, said elongated hollow cavity portion 16' terminates at its outermost end 18' in a smaller diameter opening 20' but which is now recessed to provide an engagement surface 32 used when mounting the lamp in its socket. Said recessed opening 20' can be formed with a continuous shoulder 34 bridging both inner walls of said elongated reflector cavity and which can be subsequently formed into an opening in the same manner as previously described. For example, said reflector member can be initially molded with the cavity end being closed by said continuous shoulder and then hot punched to form a smaller size opening 36 defined in the spaced apart shoulder residue. Remote location of said recessed opening from the outermost end of the hollow cavity now permits customary heat polishing of said end without melting the glass in the recessed opening region. In a preferred embodiment, the hollow cavity portion of the reflector member is initially molded with a rectangular cross-section closed by a recessed continuous shoulder at its terminal end of greater glass thickness adjacent the inner walls of said cavity. Said recessed shoulder portion is formed so that the greater glass thickness adjacent the inner walls of the cavity borders a central area of lesser glass thickness and which is of a rectangular shape to facilitate hot punching a slot opening for a pair of lamp inlead wire to project therethrough.

It will be apparent from the foregoing description that an improved reflector construction has been provided which is generally useful in lamp units employing a tungsten halogen lamp as the light source. It is not intended to limit said improvement to the specific embodiments above described, however, since it will also be apparent that modifications thereof are still within the spirit and scope of the present invention. For example, more than a single recessed opening at the base end of the elongated cavity portion of said reflector can be formed in the same manner as above described if desired in a particular lamp unit embodiment. It is intended to limit the present invention, therefore, only by the scope of the following claims.

What I claim as new and desire to secure by Letters Patent of the United States is:

1. A lamp unit which includes a molded glass reflector member terminating at its base in an elongated hollow cavity protruding from the rear side of said reflector member, said cavity having a recessed opening of smaller size at the rearmost end formed by spaced apart shoulders extending from the inner walls of said cavity when the lamp components are assembled together which provides a recessed engagement surface for mounting said lamp, and a tungsten halogen lamp secured in said hollow cavity so that its light source is positioned at the focal point of said reflector member with the lamp inleads projecting through said recessed opening.

2. A lamp unit as in claim 1 wherein the outermost end of said cavity is heat-polished but not to include said recessed opening.

3. A lamp unit as in claim 1 wherein said recessed opening is formed as a single slot through which a pair of lamp inlead wires project.

4. A method of assembling a lamp unit utilizing a glass parabolic reflector member which terminates at its base in an elongated open-ended cavity protruding from the rear side of said reflector member and having a recessed opening at the rearmost end of said cavity comprising:
   (a) molding said reflector member with the rearmost end of said cavity being closed by a recessed shoulder bridging the inner walls of said cavity,
   (b) reheating the recessed shoulder portion at the rearmost end of said cavity sufficiently to form an opening thereat in the molten glass by mechanical means,
   (c) reheating the rearmost end of said cavity to selectively heat-polish the end itself but not the recessed opening, and
   (d) assembling the lamp components together so that said recessed shoulder provides a recessed engagement surface for mounting said lamp.

5. A method as in claim 4 wherein heat-polishing of said cavity end is accomplished with a gas burner and the recessed opening is protected from the glass burner flames by heat-shield means.

6. A method as in claim 4 wherein the recessed shoulder portion at the rearmost end of said cavity is formed with a greater glass thickness adjacent the inner walls of said cavity.

7. A method as in claim 3 wherein said recessed shoulder at the rearmost end of said cavity is formed so that the greater glass thickness adjacent the inner walls of cavity borders a central area of lesser glass thickness having a rectangular shape.

* * * * *